United States Patent
Mogensen et al.

(10) Patent No.: US 10,150,908 B2
(45) Date of Patent: *Dec. 11, 2018

(54) METHOD AND SYSTEM FOR THE RECOVERY OF OIL, USING WATER THAT HAS BEEN TREATED USING MAGNETIC PARTICLES

(71) Applicant: Total E&P Danmark A/S, Copenhagen Ø (DK)

(72) Inventors: Kristian Mogensen, Copenhagen Ø (DK); Martin Vad Bennetzen, Copenhagen Ø (DK)

(73) Assignee: TOTAL E&P DANMARK A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/033,507

(22) PCT Filed: Sep. 30, 2014

(86) PCT No.: PCT/EP2014/070892
§ 371 (c)(1),
(2) Date: Apr. 29, 2016

(87) PCT Pub. No.: WO2015/044446
PCT Pub. Date: Apr. 2, 2015

(65) Prior Publication Data
US 2016/0304768 A1   Oct. 20, 2016

(30) Foreign Application Priority Data
Sep. 30, 2013  (DK) .................................. 2013 70544

(51) Int. Cl.
*E21B 43/26*     (2006.01)
*C09K 8/66*      (2006.01)
(Continued)

(52) U.S. Cl.
CPC ................ *C09K 8/66* (2013.01); *B03C 1/015* (2013.01); *B03C 1/28* (2013.01); *B03C 1/30* (2013.01);
(Continued)

(58) Field of Classification Search
USPC ......................................................... 210/695
See application file for complete search history.

(56) References Cited

U.S. PATENT DOCUMENTS

| 3,300,375 A | 1/1967 | Clifford |
| 3,970,518 A | 7/1976 | Giaever |

(Continued)

FOREIGN PATENT DOCUMENTS

| AU | 2012101651 A4 | 12/2012 |
| CN | 1736881 A | 2/2006 |

(Continued)

OTHER PUBLICATIONS

International-Type Search Report for Danish Application No. PA 2013 70544, Completed Feb. 4, 2014.
(Continued)

*Primary Examiner* — Angela M DiTrani
(74) *Attorney, Agent, or Firm* — Brinks Gilson & Lione

(57) ABSTRACT

A method of depleting a given analyte from a water source is provided. The method is applicable to water used in oil recovery, water used in natural gas recovery, the treatment of water wells, and for water used in hydraulic fluids for fracturing processes, such as water to be used in proppants or fracking fluids. The method involves depleting an analyte from a water source, said method comprising contacting a water source with a superparamagnetic or paramagnetic nanoparticle; complexing the analyte with the particle; and removing the analyte-particle complex by applying a magnetic field so as to provide a water source with depleted (Continued)

analyte content. The depleted water can then be pumped into one or more connecting injection well(s) in an oil field pushing the crude oil 10 towards one or more production well(s) thereby allowing for enhanced oil recovery from the production wells.

33 Claims, 2 Drawing Sheets

(51) Int. Cl.
  C09K 8/58 (2006.01)
  C09K 8/84 (2006.01)
  B03C 1/015 (2006.01)
  B03C 1/28 (2006.01)
  B03C 1/30 (2006.01)
  E21B 43/20 (2006.01)

(52) U.S. Cl.
  CPC .............. *C09K 8/58* (2013.01); *C09K 8/665* (2013.01); *C09K 8/845* (2013.01); *E21B 43/20* (2013.01); *E21B 43/26* (2013.01); *C09K 2208/10* (2013.01)

(56) References Cited

U.S. PATENT DOCUMENTS

| | | | |
|---|---|---|---|
| 4,246,355 A | 1/1981 | Bolto et al. | |
| 4,247,398 A | 1/1981 | Mohri | |
| 4,279,756 A | 7/1981 | Weiss et al. | |
| 4,285,819 A | 8/1981 | Yen et al. | |
| 4,452,773 A | 6/1984 | Molday | |
| 4,476,027 A | 10/1984 | Fox | |
| 4,846,962 A | 7/1989 | Yao | |
| 5,230,805 A | 7/1993 | Yates et al. | |
| 5,397,476 A | 3/1995 | Bradbury et al. | |
| 5,405,531 A | 4/1995 | Hitzman et al. | |
| 5,753,180 A | 5/1998 | Burger | |
| 5,855,790 A | 1/1999 | Bradbury et al. | |
| 6,596,182 B1 | 7/2003 | Prenger et al. | |
| 6,669,849 B1 | 12/2003 | Nguyen et al. | |
| 7,169,618 B2 | 1/2007 | Skold | |
| 8,021,540 B2 | 9/2011 | Toida | |
| 8,636,906 B2* | 1/2014 | Stein | B03C 1/01 210/683 |
| 2003/0102255 A1 | 6/2003 | Mahajan | |
| 2004/0241428 A1 | 12/2004 | Kohno | |
| 2006/0037914 A1 | 2/2006 | Niki et al. | |
| 2007/0246426 A1* | 10/2007 | Collins | C09K 8/528 210/651 |
| 2009/0017518 A1 | 1/2009 | Wu et al. | |
| 2009/0050315 A1 | 2/2009 | Fallon et al. | |
| 2009/0120842 A1 | 5/2009 | Koseoglu et al. | |
| 2010/0051510 A1 | 3/2010 | Lee | |
| 2010/0051557 A1 | 3/2010 | Etemad et al. | |
| 2010/0059449 A1* | 3/2010 | Grass | B03C 1/015 210/695 |
| 2010/0147647 A1 | 6/2010 | Koseoglu et al. | |
| 2011/0030967 A1* | 2/2011 | McGuire | C02F 1/42 166/369 |
| 2011/0139687 A1 | 6/2011 | Yeganeh et al. | |
| 2011/0306525 A1 | 12/2011 | Lighthelm | |
| 2012/0018382 A1 | 1/2012 | Stein | |
| 2012/0103913 A1 | 5/2012 | Kiyoto et al. | |
| 2012/0145601 A1 | 6/2012 | Lee | |
| 2012/0145637 A1 | 6/2012 | Alfadul et al. | |
| 2013/0023448 A1 | 1/2013 | Glasscott et al. | |
| 2013/0134098 A1 | 5/2013 | Kostedt et al. | |
| 2013/0168097 A1* | 7/2013 | Janssen | E21B 43/20 166/305.1 |
| 2013/0216833 A1 | 8/2013 | Logli et al. | |
| 2014/0131288 A1 | 5/2014 | Gu et al. | |
| 2015/0217288 A1 | 8/2015 | Hutter et al. | |

FOREIGN PATENT DOCUMENTS

| | | |
|---|---|---|
| CN | 101023242 A | 8/2007 |
| CN | 102264631 A | 11/2011 |
| CN | 102531116 | 7/2012 |
| CN | 102675537 A | 9/2012 |
| CN | 103084147 A | 5/2013 |
| DE | 4307262 A1 | 9/1994 |
| DE | 10160664 A1 | 6/2003 |
| DE | 102009035764 A1 | 2/2011 |
| EP | 0083202 A1 | 7/1983 |
| EP | 2244268 A1 | 10/2010 |
| EP | 2339343 A1 | 6/2011 |
| EP | 2349919 A2 | 8/2011 |
| GB | 2019378 A | 10/1979 |
| GB | 1583881 A | 2/1981 |
| WO | 9707064 A1 | 2/1997 |
| WO | 2008055371 A2 | 5/2008 |
| WO | 2009123683 A2 | 10/2009 |
| WO | 2010062586 A2 | 6/2010 |

OTHER PUBLICATIONS

Office Action for Danish Application No. PA 2013 70544, Completed May 15, 2014.
International Search Report and Written Opinion for PCT/EP2014/070892, dated Jan. 20, 2015.
International Preliminary Report on Patentability for PCT/EP2014/070892, dated Apr. 5, 2016.
Bruce et al., "Synthesis, characterisation and application of silica-magnetite nanocomposites", Available online Aug. 2, 2004.
Arthur et al., Technical Summary of Oil Produced Water Treatment Technologies, Mar. 2005, pp. 1-60 (Year/ 2005).
Urban et al., "Functionalized paramagnetic nanoparticles for waste water treatment", published May 25, 2010.
Igunna et al., Produced Water Treatment Technologies, Apr. 30, 2012 (Year/ 2012).
Dejak, The Next Generation Water Filter for the Oil and Gas Industry, Young Technology Showcase, Oct. 2013 (Year/ 2013).
Old Oil Field Waterplood Operations and Enhanced Oil Recovery Potential, vol. 2, Chapter 12, p. 1-56, no date (Year/ 0).

* cited by examiner

METHOD AND SYSTEM FOR THE RECOVERY OF OIL, USING WATER THAT HAS BEEN TREATED USING MAGNETIC PARTICLES

RELATED APPLICATIONS

This application claims the benefit under 35 U.S.C. § 371 of the filing date of International Patent Application No. PCT/EP2014/070892, having an international filing date of Sep. 30, 2014, which claims priority to Danish Application No. PA 2013 70544, filed Sep. 30, 2013, the contents of International Patent Application No. PCT/EP2014/070892 are incorporated herein by reference in their entirety.

FIELD OF INVENTION

The method of the invention is directed to using paramagnetic nanoparticles for the depletion of analytes from large volumes of water suitable for water flooding used in oil recovery, in natural gas recovery and for water used in fracking fluids.

BACKGROUND OF THE INVENTION

Water flooding as an oil recovery technique has been in use since 1890 when operators in the US realised that water entering the productive reservoir formation was stimulating production. In some cases, water is supplied from an adjacently connected aquifer to push the oil towards the producing wells. In situations where there is no aquifer support, water must be pumped into the reservoir through dedicated injection wells. The water phase replaces the oil and gas in the reservoir and thereby serves to maintain pressure. Recovery factors from water flooding vary from 1-2% in heavy oil reservoirs up to 50% with typically values around 30-35%, compared to 5-10% obtained from primary depletion without water flooding.

Large volumes of water are used in water flooding so the water source is typically seawater. Certain naturally occurring elements, compounds, minerals, ions, and bacteria as well as organic pollutants, phosphate pollutants, nitrates, sulfates, and other pollutants from detergent use, pesticide use and fertilizer use may end up in the water source used for water flooding. It is not desirable for these water contaminants to be contacted with crude oil mixtures. These water "contaminants" can lead to or catalyze various chemical reactions with the oil, or with the containers and oil pipes, such as oxidation, hydrogenation, addition or elimination reactions. Furthermore, these "contaminants"/analytes can negatively impact the oil recovery process by affecting the capacity of the water to create emulsions and to penetrate the reservoir rock. The impact of these water contaminants/analytes can lead to lower grade oil product, reduced oil recovery, reduced efficacy of linked-polymer solution or related processes, and reduced life time of machinery, due to corrosion of piping and other equipment. It is therefore desirable to remove analytes from the water source before its use in oil recovery processes.

Currently, ions, salts, elements, minerals and other analytes are removed from injection water by various processes, such as reverse osmosis, filtration, including nano-filtration, vapour distillation and freezing desalination. The removal of bacteria, particularly sulphate reducing bacteria, from water sources used for water flooding is similarly advantageous. Various techniques are currently used for removal of these bacteria from water sources, including ultraviolet light and biocides. Sulfate-reducing bacteria (SRB) are bacteria present in seawater used for waterflooding which have the unfortunate effect of producing hydrogen sulfide ($H_2S$) that cause corrosion of oil platform facility equipment. Additionally bacteria can form so-called biofilms on metal surfaces leading to damage of the equipment.

Corrosion of pipelines is a major concern for the oil industry. Over the past two decades, it has become clear that corrosion in water injection pipelines is to a large extent caused by $H_2S$-producing bacteria; this phenomenon is commonly referred to as microbially-induced corrosion (MIC). The bacteria responsible for corrosion belong to a group of sulphate-reducing bacteria (SRB), which are active under anaerobic conditions.

SUMMARY OF THE INVENTION

The invention is generally directed to a method of depleting the analyte content in a water source for a water flooding process and for treating produced water. The invention relates to a method of treating an oil well, more specifically to a method for recovering crude oil a hydrocarbon-bearing reservoir by water flooding, said methods using water depleted in analyte content.

The method of the invention is applicable to water used in oil recovery, water used in natural gas recovery, the treatment of water wells, and for water used in hydraulic fluids for fracturing processes, such as water to be used in proppants or fracking fluids.

It is furthermore applicable to the treatment of water which has been used for hydraulic fracturing to remove contaminants, such as from stored water from unlined surface ponds.

One aspect of the invention is directed to a method for recovering crude oil or natural gas from the ground, the method comprises the steps of:
(i) Providing a water source;
(ii) Capturing one or more analyte(s) from the water source by contacting the water source with a superparamagnetic or paramagnetic particle capable of binding the one or more analyte(s) present in the water source providing a capturing mixture;
(iii) Removing the analyte(s) bound to the superparamagnetic or paramagnetic particles from the capturing mixture by applying a magnetic field providing a depleted water;
(iv) Pumping the depleted water into one or more connecting injection well(s) in an oil field pushing the crude oil towards one or more production well(s);
(v) Recovering the crude oil from the one or more production well(s).

According to this aspect, the analyte can be a compound, a mineral, one or more elements or ions, a bacteria, phosphate pollutants, nitrates, sulphate and/or pollutants from detergent use, pesticide use or fertilizer use.

According to an embodiment of this aspect, the diameter of superparamagnetic or paramagnetic particles are between 1 nm-10 μm, preferably the superparamagnetic or paramagnetic particles are superparamagnetic nanoparticles of size in the range of 1-1000 nm.

According to an embodiment of this aspect, the particle size of the nano particles is in the range of 1-600 nm, such as in the range of 3-500 nm, e.g. in the range of 5-300 nm, e.g. in the range of 7.5-200 nm, such as in the range of 10-100 nm, e.g. in the range of 15-50 nm.

According to an embodiment of this aspect, the weight of superparamagnetic or paramagnetic particle capable of binding the one or more analyte(s) present in the water source does not exceed 0.5 kg per 1.000 kg water i.e. 0.05 wt % independent of the size of the particle.

According to an embodiment of this aspect, the weight of superparamagnetic or paramagnetic particle capable of binding the one or more analyte(s) present in the water source is at least 250 kg water/cm$^2$ particles. This corresponds to a weight percent of partcles of 0.000000004 wt % for particles with a radius=50 μm.

According to an embodiment of this aspect, the superparamagnetic or paramagnetic particle is capable of binding the one or more analyte(s) present in the water source by non-specific binding and/or by specific binding.

According to an embodiment of this aspect, the superparamagnetic or paramagnetic particles are coated with an organic compound or an inorganic compound.

According to an embodiment of this aspect, the superparamagnetic or paramagnetic particles are coated with a polymer, such as a polysaccharide, an alginate, a chitosan, a PEG, a dextran or a polyethyleneamine.

According to an embodiment of this aspect, the superparamagnetic or paramagnetic particles are functionalized with a moiety capable of specifically binding the one or more analyte(s) present in the water source.

According to an embodiment of this aspect, the water source is selected from seawater, water from an estuary, brackish water, or generally untreated water having a salinity above 0.05%.

According to an embodiment of this aspect, the water source is sea water or brackish water having a salinity above 2% and below 5%, normally around 3.5%.

According to an embodiment of this aspect, the water source has a salinity of less than 250.000 ppm.

According to an embodiment of this aspect, the water source in the capturing in step (ii) and/or the removing in step (iii) has a temperature in the range 4-60° C., preferably in the range of 4-40° C. and/or has a pressure in the range 1-200 atm.

According to an embodiment of this aspect, the steps (i), (ii) and (iii) are a continuous process of providing water depleted in the particular analyte(s).

According to an embodiment of this aspect, the water has been depleted in at least one particular analyte(s), such as at least two particular analytes, e.g. at least three particular analytes, such as at least four particular analytes.

According to an embodiment of this aspect, the depleted water is used for water flooding, or as hydraulic fluid for fracturing processes.

A further aspect of the invention is directed to a system for recovering of crude oil comprising a water treatment plant, one or more injection well(s) and one or more oil production well(s), wherein
  the water treatment plant comprises at least two regions, a reaction region where superparamagnetic or paramagnetic particles will bind to the analyte(s) and a holding region holding ready-to-bind superparamagnetic or paramagnetic particles,
  the reaction region is connected to the holding region allowing addition of superparamagnetic or paramagnetic particles to the reaction region, the reaction region further has an inlet for untreated water, an outlet for treated water and is provided with means for mixing and means for applying a magnetic field,
  the reaction tank outlet for treated water is connected with the one or more injection well(s) which injection wells are further connected to the one or more oil production well(s).

Each "region" may be constituted by a single tank provided with rigid walls of plastic or metal, or it may be constituted of a several tanks or tubes with rigid walls of metal or plastic. Each region can hold a liquid and allows for liquid being transferred to and from the region.

According to an embodiment of this further aspect, the reaction region is provided with rigid walls of non-metallic material such as plastic.

According to an embodiment of this aspect, the water treatment plant comprises a third region in form of one or more storage compartments where the reaction tank outlet for treated water is connected to one or more storage compartments which storing compartments are then connected with the injection well(s).

According to an embodiment of this aspect, the water treatment plant further comprises a separation region where superparamagnetic or paramagnetic particles are regenerated from the mixture of superparamagnetic or paramagnetic particles bonded to analytes.

According to an embodiment of this aspect, the one or more storage compartments of the third region is dimensioned to hold at least the amount to be used in the injection well(s) during the residence time of the reaction region. If residence time for a batch in the reaction region is 1 hour and the amount to be used in the injection well pr. 1 hour is 5000 m$^3$, then the storage compartment should be able to hold 5000 m$^3$.

The present invention may be used as a pre-step for low-salinity pulse (LSP) treatment where low-salinity water is injected to analyte containing environments, such as bacteria containing environments, leading to cell membrane explosion of bacteria due to osmotic pressure resulting in efficient killing of the bacteria. The pre-step of this is removal of dissolved salts from seawater which is to be used for LSP treatment to achieve low salinity by means of particles capable of sequestering dissolved salts. The particles can become magnetic when a magnetic field is applied and will subsequently be dragged out of the solution thus removing sequestered salt ions. The ions will subsequently be removed from the particles and the particles can hereafter be re-used for next-rounds of ion depletion.

A. Starting point: In a first recipient, magnetic (superparamagnetic or paramagnetic) particles MPs are found. In a second recipient, the water source comprising the one or more analyte is found.

B. Immobilization: The MPs are mixed with the analyte containing water source. The one or more analytes are caught and immobilized to the particles.

C. Magnetization: A magnetic field is applied to the mixture and the now magnetized particles are removed from the water phase.

Figure 1:
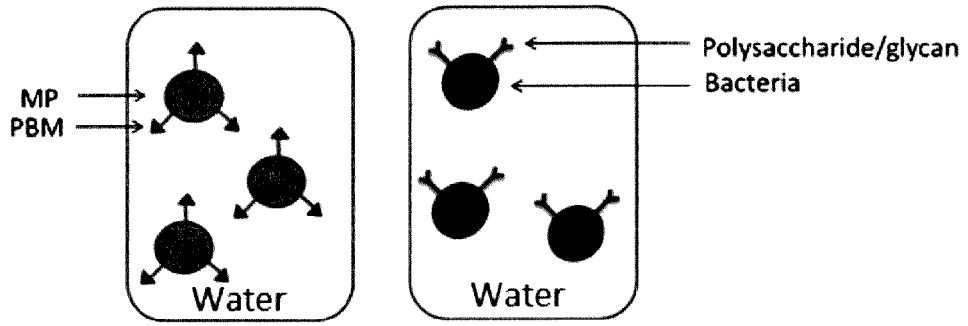
FIG. 1: The basic process
Figure 1:
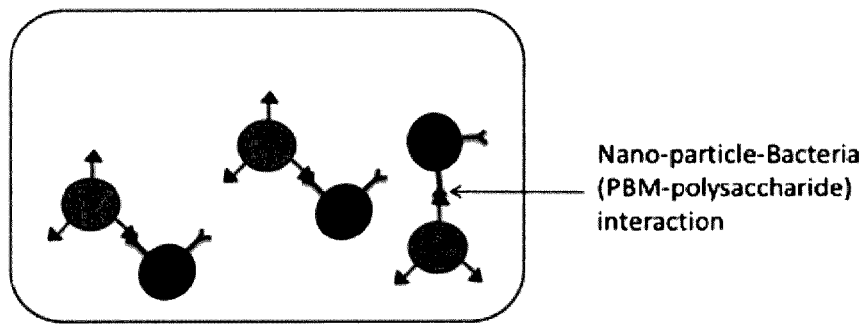
Figure 1:
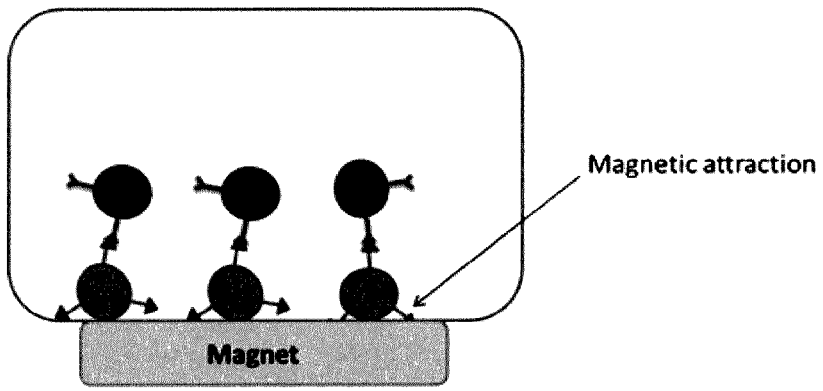
Figure 2:
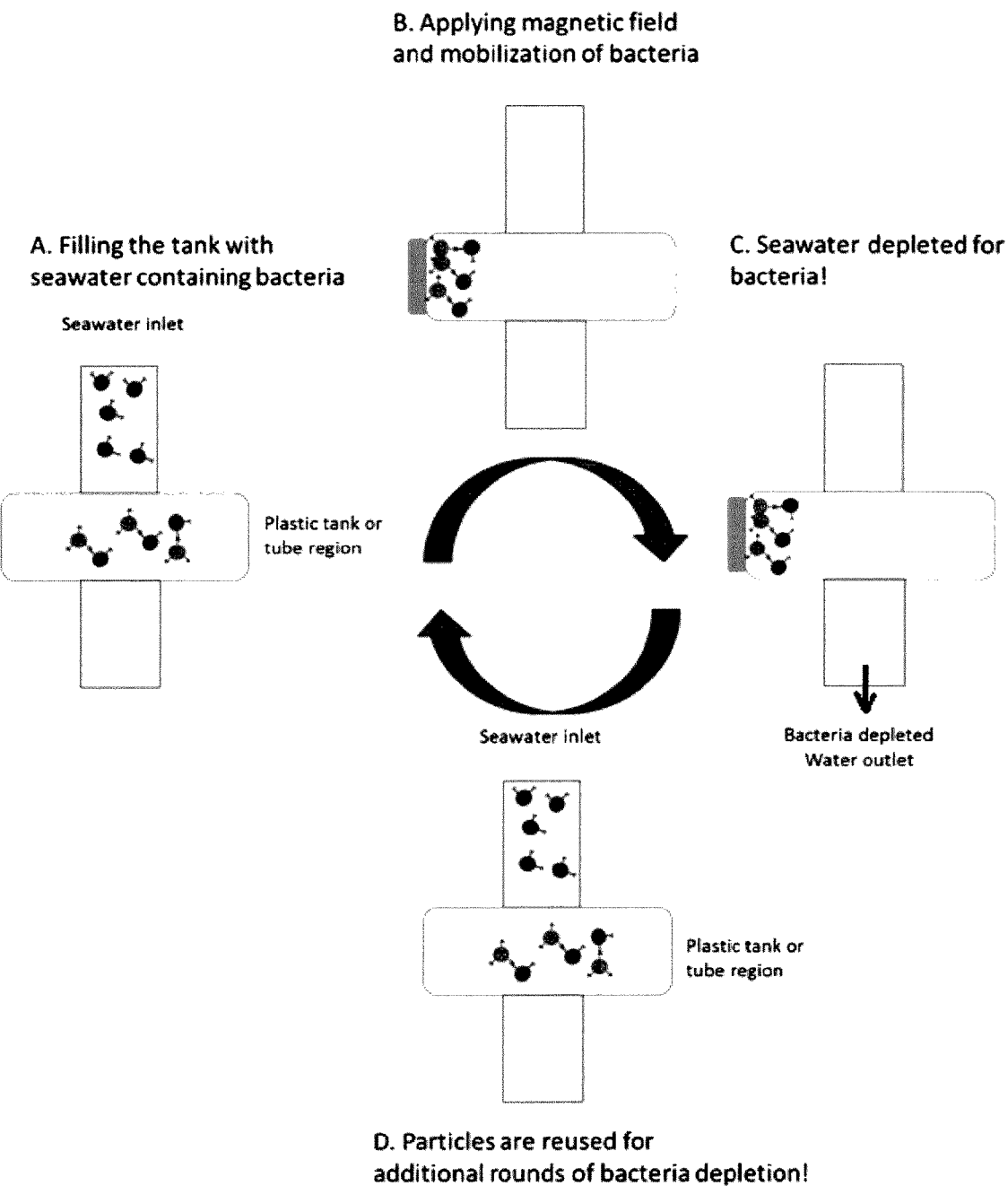

FIG. 2: A continuous process with reusable particles

A. Seawater enters a conventional tube. A tank is top-loaded with analyte-containing seawater. A central tank comprises (super)paramagnetic particles.

B. Seawater enters a plastic tank or a tube-region made by plastic where the particles are present. The contents of the two tanks are mixed and the analytes are immobilized onto the particles). Time is allowed for mixing and equilibration. A magnetic field is applied on the plastic tank—and the particles are pulled towards the magnet.

C. The seawater is depleted of the analytes and the depleted water is sent to down-stream tubes and ready for injection.

D. The trapped particles are removed (with caught analyte) to another compartment.
  i: The analytes are released via mild elution.
  ii: The analytes are collected
  iii: The particles are re-suspended after elution and removal of external magnetic field and can now be re-used.

The particles may be used for additional rounds of analyte depletion.

DETAILED DESCRIPTION OF THE INVENTION

The invention is generally directed to a method of depleting the content of a selected analyte or a combination of analytes (hereinafter referred to solely as "analyte") in a water source, such as for a water flooding process. The invention relates to a method of treating an oil well, more specifically to a method for recovering crude oil from a hydrocarbon-bearing reservoir by water flooding, said methods using water depleted in analyte content.

The method of the invention is applicable to water used in oil recovery, water used in natural gas recovery, the treatment of water wells, and for water used in hydraulic fluids for fracturing processes, such as water to be used in proppants or fracking fluids.

It is furthermore applicable to the treatment of water which has been used for hydraulic fracturing to remove contaminants, such as from stored water from unlined surface ponds.

The invention is directed to a method depleting the analyte content in a water source, such as for a water flooding process, said method comprising the steps of
  a. Contacting the water source with a superparamagnetic or paramagnetic particle;
  b. Complexing at least a portion of an analyte with the particle so as to form an analyte-particle complex;
  c. Removing the analyte-particle complex by applying a magnetic field so as to provide a water source with depleted analyte content.

The analyte may be selected from chemical elements, compounds, minerals, ions, and bacteria including organic pollutants, phosphate pollutants, nitrates, sulfates, and other pollutants from detergent use, pesticide use and fertilizer use.

The particles are paramagnetic in nature in that they are attracted to a magnet when placed in a magnetic field but retain no magnetic memory upon removal of the magnetic field. This characteristic prevents aggregation and allows for easy dispersion of the particles. Paramagnetic materials include most chemical elements and some compounds, they have a relative magnetic permeability greater or equal to 1 (i.e., a positive magnetic susceptibility) and hence are attracted to magnetic fields. The particles are of a chemical nature so as to have paramagnetic properties. The paramagnetism of the particle may be achieved by any number of elements or compounds. The particle may be superparamagnetic or paramagnetic due to the use of an organic superparamagnetic or paramagnetic compound, a metallic superparamagnetic or paramagnetic compound or an organometallic superparamagnetic or paramagnetic compound.

The superparamagnetism or paramagnetism of the particle may be due to the particles comprising an element selected from the group consisting of lithium, oxygen, sodium, magnesium, aluminum, calcium, titanium, manganese, iron, cobalt, nickel, strontium, zirconium, molybdenum, ruthenium, rhodium, palladium, tin, barium, cerium, neodymium, samarium, europium, gadolinium, terbium, dysprosium, holmium, erbium, thulium, osmium, tungsten, tungsten iridium, tungsten and platinum. Strong paramagnetism is exhibited by compounds containing iron, palladium, platinum, and the rare-earth elements. Accordingly, the particles preferably comprise an element selected from the group consisting of iron, palladium, platinum, and the rare-earth elements. The superparamagnetic or paramagnetism of the particle may comprise an organometallic compound.

The particles may comprise a superparamagnetic or paramagnetic core, optionally coated with an inorganic or organic compound; or may comprise a composite core of a paramagnetic and a non-paramagnetic compounds. The particle may be selected from the group consisting of a particle functionalized by conjugation with a binding molecule, a nanoparticle, or a nanoparticle conjugated with a binding molecule.

Polymers are suitable as non-paramagnetic components of super-paramagnetic or paramagnetic composite particles, which comprise the super-paramagnetic or paramagnetic metallic or organometallic component and non-paramagnetic polymeric component. Polymeric components may provide functionality useful for binding to an analyte or functionality which can be further derivatized for binding to an analyte. Examples of polymers for use in a composite core include styrenic polymers or copolymers, (meth)acrylate polymers or copolymers, or a highly conjugated aromatic polymer.

The particles are superparamagnetic or paramagnetic particles and may bind the analyte either by virtue of their small size or by means of a binding molecule, or a combination thereof. The nanoparticles may bind to the analyte by virtue of their small size or due to complexation
  via a functionality present in metallic or organometallic core;
  via further functionalization of the functionality present in metallic or organometallic core
  via a functionality present in the polymer used in the preparation of the particle core;
  via further functionalization of the polymer used in the preparation of the particle core,
  via a coating which comprises a functionality; or
  via functionalization of a coating for adjusting surface properties for binding to the analyte as well as for blendability of the nanoparticles.

In one embodiment, the particle is a nanoparticle without any conjugated binding molecule (BM) (i.e. non-functionalized) where analyte adsorption or complexation to the particle would occur solely with surface energy as driving force. For very small nanoparticles surface energy will be large due to the high area-to-volume ratio and due to quantum confinement effects (i.e. the size is less than the wavelength of electrons (de Broglie wavelength) leading to the bypassing of periodic quantum mechanical boundary conditions). Surface energy and driving forces can be tuned, for instance by the size or the selection of the polymer material.

The superparamagnetic or paramagnetic particles may furthermore comprise or at least partially comprise a coating of an organic compound or an inorganic compound.

Wherein the superparamagnetic or paramagnetic particles are at least partially coated with an organic compound, the organic compound may be typically selected from a polymer or copolymer comprising a polysaccharide, an alginate, a chitosan, a PEG, a dextran or a polyethyleneamine.

The particles may comprise a functional group, either from the particle or from a coating, selected from the group consisting of carboxy (e.g., carboxylic acid groups), epoxy, ether, ketone, amine, hydroxy, alkoxy, alkyl, aryl, aralkyl, alkaryl, lactone, ionic groups such as ammonium groups and/or carboxylate salt groups, polymeric or oligomeric groups or a combination comprising at least one of the forgoing functional groups.

The polymers used for further functionalization of the particle may be selected from the group consisting of an antibody, a peptide of 2-200 amino acids, an amino acid, a polysaccharide, a sugar, a nucleotide or nucleoside including DNA or RNA, a $C_1$-$C_{30}$ alkyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof.

The nanoparticle composition may be further derivatized by grafting certain polymer chains to the functional groups. For example, polymer chains such as acrylic chains having carboxylic acid functional groups, hydroxy functional groups, and/or amine functional groups; polyamines such as polyethyleneamine or polyethyleneimine; poly(alkylene glycols) such as poly(ethylene glycol) and poly(propylene glycol), and polysaccharide chains may be grafted onto the nanoparticle by reaction with functional groups found on the particle.

In a particular interesting embodiment, the particles may be prepared by coating a layer of magnetite and polystyrene onto monodispersed (i.e. uniform sized) polystyrene core particles. The magnetite content of these paramagnetic particles can be adjusted but typically represents about 10% to 15% for 1 micron particles. The paramagnetic particles can be easily separated from a suspension magnetically. These particles become non-magnetic when removed from a magnet, and do not retain any detectable magnetism even after repeated exposure to strong magnetic field.

Examples of dextran-based spherical beads include Kisker-Biotech® dextran-based nanoparticles in the size range of 20-100 nm); Nanomag®-D, made of dextran polymers of size 130 nm; and MagCellect® particles of size 150 nm. Superparamagnetic particles made by other types of polymers or inorganic material may be used as well. One particular advantage of using such small particles is that the size, physical properties, chemical reactivity and conjugation possibilities is flexible and can be tailor-made.

Suitably, the particles comprise a superparamagnetic or paramagnetic core, such as a magnetite core. The magnetite core may optionally be coated, or at least partially coated in silica or a silicate, or a ($SiO_2$)-magnetite ($Fe_3O_4$) composite. As an example, the superparamagnetic or paramagnetic particle, such as a nanoparticle or microparticle, may be coated or partially coated with tetraethyl ortho silicate, $Si(OC_2H_5)_4$ or TEOS. In the embodiment wherein the superparamagnetic or paramagnetic particles are at least partially coated with an inorganic compound, the inorganic compound may suitably be selected from silica, including derivatized silica.

Typically, the particles are superparamagnetic particles of size in the range of 1-1000 nm, such as in the range of 1-600 nm. Preferably, the diameter of superparamagnetic or paramagnetic particles are in the range of 1-500 nm, such as in the range of 1-300 nm, preferably in the range of 5-300 nm, such as in the range of 5-200 nm, typically 5-150 nm.

In a further embodiment, particles are at least partially functionalized with a conjugated binding molecule, such as a polysaccharide-binding molecule (PBM). Under this embodiment, the size of the particles may be larger than the non-functionalized particles. Accordingly, the diameter of superparamagnetic or paramagnetic particles may be between 1 nm-10 μm, depending on whether they are non-functionalized or at least partially functionalized with a polysaccharide-binding molecule.

In one embodiment, the particles are microparticles or nanoparticles of superparamagnetic or paramagnetic cores, at least partially functionalized with a conjugated polysaccharide-binding molecule (PBM).

Particles may be of the nanometer size of less than 150 nm since particles of this diameter have a high area-to-volume ratio leading to a high PBM-conjugation capacity. Suitably, the particles may be dextran-based spherical beads.

In a further suitable embodiment, the particle has a diameter of less than 25 nm, such as less than 20 nm, and is made of iron or iron oxide ($Fe_3O_4$, magnetite). These particles have the advantage of very low sedimentation rates and do not plug micrometer scale pores.

The superparamagnetic or paramagnetic particle may bind the bacteria present in the water source by non-specific binding or by specific binding. Accordingly, the superparamagnetic or paramagnetic particle is capable of binding the bacteria present in the water source by non-specific binding or by specific binding. The superparamagnetic or paramagnetic particles may be functionalized with a moiety capable of non-specifically binding the bacteria present in the water source. Alternatively, the superparamagnetic or paramagnetic particles are functionalized with a moiety capable of specifically binding the bacteria present in the water source.

It is well-known that the cell surface of bacteria is covered with polysaccharides (sugar polymers) conjugated to lipids and proteins. These molecular components make the surface facing the extracellular phase hydrophilic mediating interactions between the bacteria and other bacteria or organisms, and are involved in biofilm formation. In an important embodiment of the present invention, a polysaccharide-binding molecule (PBM) is conjugated to a superparamagnetic or paramagnetic particle. Accordingly, an aspect of the invention relates to a specific or non-specific complexation of the bacterial polysaccharides and a polysaccharide-binding molecule (PBM) of the particle.

The polysaccharide-binding molecule could be any kind of polysaccharide binding molecule, preferably cheap, with very high affinity and unselective towards sugar motifs of glycolipids and glycans. Concrete PBMs could be lectins (proteins), such as Sclerotium rolfsii lectin (SRL), Aleuria Aurantia Lectin (ALL), Jacalin, Pseudomonas lectin II (PA-IIL), concanavalin A (ConA), wheat germ lectin (WGL) etc. which can be derived from plants, bacteria and fungi. Production can easily be made in large (industrial) scale via gene cloning techniques and appropriate engineering of plasmids to be transferred into e.g. bacteria. The polysaccharide-binding molecule is not limited or restricted to antibodies or proteins but could just as well be selected from organic or inorganic molecules capable of binding polysaccharides.

The polysaccharide-binding molecule may be an organic or inorganic compound or a combination thereof. Suitable embodiments of organic polysaccharide-binding molecule may be selected from the group consisting of a protein, including an antibody, a peptide of 2-200 amino acids, an amino acid, a polysaccharide, a sugar, a nucleotide or nucleoside including DNA or RNA, a $C_1$-$C_{30}$ alkanyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof.

The polysaccharide-binding molecule may be selected from a polymer or copolymer comprising a polysaccharide, an alginate, a chitosan, a PEG, a dextran or a polyethyleneamine.

The polysaccharide-binding molecule may be an inorganic compound, optionally modified with an organic compound. The inorganic compound, such as silica, may be optionally modified with an organic compound, such as an organic compound selected from the group consisting of a protein, including an antibody, a peptide of 2-200 amino acids, an amino acid, a polysaccharide, a sugar, a nucleotide or nucleoside including DNA or RNA, a $C_1$-$C_{30}$ alkanyl, a $C_1$-$C_{30}$ alkenyl, a $C_1$-$C_{30}$ alkylyl, a $C_1$-$C_{30}$ ether, a $C_1$-$C_{30}$ amine, a $C_1$-$C_{30}$ ester, a $C_1$-$C_{30}$ amide, and combinations thereof.

In a suitable embodiment, the inorganic polysaccharide-binding molecule is tetraethyl ortho silicate, $Si(OC_2H_5)_4$ or TEOS, which has been shown to bind to bacteria due to its high hydrophilicity.

In a combination of suitable embodiments, the particles may be iron or iron oxide particles with an average diameter of less than 50 nm, such as less than 20 nm, such as less than 10 nm, and may further be at least partially coated with polyethylene glycol or a co-polymer comprising polyethylene glycol.

In a further combination of suitable embodiment, the particle is a superparamagnetic iron oxide particle, optionally coated, or at least partially coated, with silica. The silica coating encapsulates the superparamagnetic iron oxide particles and makes the particles become very hydrophilic. Typically, the size of such coated or partially coated iron oxide particles is in the range of 5 to 50 nm, typically 5 to 20 nm. Such nanoparticles can be easily synthesized or bought commercially. One advantage of using very small silica coated particles is that these are membranolytic, in that they disrupt membrane integrity, to cells themselves.

The silica coated or partially silica coated iron oxide particles may optionally further comprise a polymer or co-polymer coating to serve as a polysaccharide-binding molecule. The polymer or co-polymer coating may be added in selected proportions so as to tune the binding properties of the at least partially silica coated particle. In a typical embodiment, PEG may be used to coat the at least partially silica coated particle.

As stated, an aspect of the invention relates to a method of treating an oil well, the method comprising the steps of
 (i) Providing a water source;
 (ii) Capturing analytes from the water source by contacting the water source with a superparamagnetic or paramagnetic particle capable of binding to analytes present in the water source providing a capturing mixture;
 (iii) Removing the analyte bound to the superparamagnetic or paramagnetic particles from the capturing mixture by applying a magnetic field providing a depleted water;
 (iv) Pumping the depleted water into one or more connecting injection well(s) in an oil field pushing the crude oil towards one or more production well(s);
 (v) Recovering the crude oil from the one or more production well(s).

A magnetisable particle becomes magnetic when a magnetic field is present, and becomes non-magnetic when the field is removed. According to the present invention, particles, such as those functionalized, are added to a water source, such as the seawater, preferably at an injection point upstream the pumps. The particles should not be permanently magnetic since such particles would aggregate and precipitate.

In embodiments where the analyte is a bacterium, when the particles are added, the polysaccharides of the bacteria membrane surface will bind to the PBM-part, specifically or non-specifically and typically with high affinity, and thus catch the bacteria and immobilize them, thereby forming a bacteria-particle complex. Due to the large area-to-volume ratio of the particles, the particles will have a large analyte-storage/catching capacity.

The analyte-particle complexes, such as bacteria-particle complexes or ion-particle complexes, may be then subsequently isolated from the water by applying a magnetic field that magnetizes the particles causing them to migrate towards the magnet. This procedure takes place in a non-metallic environment (such as plastic tanks). The particles are then removed and the analytes are released by mild elution with high concentration of sugar, by means of competitive elution, or low concentration of salt. Harder elution can be alternatively be used if needed. Bacteria can then be killed and whilst bacteria and other analytes may be removed via osmosis, electrolyte addition, antibiotics, or isolated (if it is of interest to make enrichment cultures or research experiments) or discharged back to the sea or otherwise discarded.

An advantage of this method is that in at least conditions of mild elution, the particles may be recovered, re-suspended and reused again for another round of treatment of a water source.

The water source may be a water source used in these types of processes and is a non-limiting aspect of the invention. Suitably, the water source is selected from seawater, produced water, water from an estuary, brackish water, water having a salinity above 0.05% (such as above 15 ppt) and untreated water. In the water treatment processes currently envisaged such as for oil or gas recovery, the water source is typically sea water. The water source be an untreated water source or may also in any form pre-treated water, e.g. treated by reverse osmosis, nano-filtration, vapour distillation, or freezing desalination.

Typically, depending on the nature of the water source, the water source has a salinity of less than 250.000 ppm. The water source may have a mineral content, typically a mineral content of less than 7.000 ppm.

The water source in the capturing in step (ii) and/or the removing in step (iii) typically has a temperature in the range 4-60° C., preferably in the range of 4-40° C. and/or has a pressure in the range 1-200 atm. Preferably the water pressure is in the range of 1-10 atm since 1-10 atm is the pressure range valid for water treatment in tubes/containers before the pump system used for pumping water into a subsurface reservoir.

In some aspects of the invention, the process of the invention involves capturing bacteria from the water source by contacting the water source with a superparamagnetic or paramagnetic particle capable of binding to bacteria present in the water source providing a capturing mixture; and furthermore removing the bacteria bound to the superparamagnetic or paramagnetic particles from the capturing mixture by applying a magnetic field providing a depleted water. In other aspects of the invention, the process involves contacting steps, complexing steps, and removing steps. The water source in the any one or more of the capturing step, the removing step, the contacting step, and the complexing step may have a temperature in the range 4-60° C., preferably in the range of 4-40° C. The pressure may be in the range 1-200 atm.

An object of the invention is the depletion or substantial depletion of selected analytes or a combination of selected analytes from a water source. Subsequent to the depletion process, the depleted water is typically used for its intended purpose, including in an oil recovery process, for recovering crude oil from the ground by water flooding. The water flooding may be a continuous process of providing water depleted in analyte content. The depleted water is depleted in the sense that it has been depleted in at least one type of analyte. Preferably, the depleted water source is at least partially depleted in sulphate-reducing bacteria content or in the content of at least one ion type.

Depending of the prevalence of the analyte in the water source (the concentration of bacteria in the water source) and the size and functionalization of the particle, the amount of particle used will vary. The weight of superparamagnetic or paramagnetic particle capable of binding the analyte present in the water source typically will not exceed 0.5 kg per 1.000 kg water (i.e. 0.5 wt %) independent of the size of the particle. wherein the weight of superparamagnetic or paramagnetic particle capable of binding the analyte present in the water source does not exceed 0.5 kg per 1.000 kg water (i.e. 0.5 wt %) 250 kg water/cm$^2$ particles independent of the size of the particle, e.g. at least 500 kg water/cm$^2$ particles independent of the size of the particle, such as at least 750 kg water/cm$^2$ particles independent of the size of the particle, e.g. at least 1.000 kg water/cm$^2$ particles independent of the size of the particle, such as at least 2.500 kg water/cm$^2$ particles independent of the size of the particle, e.g. at least 5.000 kg water/cm$^2$ particles independent of the size of the particle, such as at least 7.500 kg water/cm$^2$ particles independent of the size of the particle, e.g. at least 10.000 kg water/cm$^2$ particles independent of the size of the particle, such as at least 15.000 kg water/cm$^2$ particles independent of the size of the particle.

According to the process of the invention the water source and the superparamagnetic or paramagnetic particles are typically contacted in a first water tank, wherein the first water tank is made of a non-magnetisable or non-magnetic material such as plastic. After the capturing of the analyte from the water source by contacting the water source with a superparamagnetic or paramagnetic particle and removing the analyte bound to the superparamagnetic or paramagnetic particles from the capturing mixture by applying a magnetic field so as to provide depleted water, the depleted water is typically stored in a second water tank.

The invention is furthermore directed to a composition comprising water and an analyte-particle complex, particularly seawater. The invention is furthermore directed to seawater depleted in its analyte content obtainable by the method of the invention.

A further aspect of the invention is directed to a system comprising an oil production plant connected to at least one production well and a water purification plant connected to at least one injection well, wherein the water purification plant comprises at least one inlet, at least one capturing site, at least one analyte removing site and at least one outlet, said at least one capturing site comprises superparamagnetic or paramagnetic particles capable of binding analytes present in the water source and wherein the at least one removing site comprises a non-magnetisable material and means for applying a magnetic field wherein the outlet from the water purification plant is connected to the at least one injection well. The particles and process of the system are as defined above.

Another aspect of the invention relates to the use of water depleted in a selected analyte or combination of analytes for recovering oil by water flooding, wherein the depletion of the analytes from water is performed by capturing at least a portion of the analytes from a water source by contacting the water source with superparamagnetic or paramagnetic particles capable of binding the selected analyte present in the water source providing a capturing mixture followed by removing the analyte bound to the superparamagnetic or paramagnetic particles from the capturing mixture by applying a magnetic field providing a water reduced analyte content.

The process of the invention may be a continuous process or a batch-wise process, depending on the conditions of the installation in place.

One aspect of the invention is directed to a method for recovering crude oil from the ground by water flooding, the method comprises the steps of:
(vi) Providing a water source;
(vii) Capturing one or more analyte(s) from the water source by contacting the water source with a superparamagnetic or paramagnetic particle capable of binding the one or more analyte(s) present in the water source providing a capturing mixture;
(viii) Removing the analyte(s) bound to the superparamagnetic or paramagnetic particles from the capturing mixture by applying a magnetic field providing a depleted water;
(ix) Pumping the depleted water into one or more connecting injection well(s) in an oil field pushing the crude oil towards one or more production well(s);
(x) Recovering the crude oil from the one or more production well(s).

2. A method of depleting the content of an analyte in a water source said method comprising the steps of
a. Contacting the water source with a functionalized superparamagnetic or paramagnetic particle said functionalization adapted to complex the particle to the analyte;
b. Complexing at least a portion of the analyte with the particle so as to form an analyte-particle complex;
c. Removing the analyte-particle complex by applying a magnetic field so as to provide a water source with depleted analyte content.

3. A method according to any of claims 1 and 2, wherein the diameter of superparamagnetic or paramagnetic particles are between 1 nm-10 µm, preferably the superparamagnetic or paramagnetic particles are superparamagnetic nanoparticles of size in the range of 1-1000 nm.

4. A method according to claim 3, wherein the particle size of the nano particles is in the range of 1-600 nm, such as in the range of 3-500 nm, e.g. in the range of 5-300 nm, e.g. in the range of 7.5-200 nm, such as in the range of 10-100 nm, e.g. in the range of 15-50 nm.

5. A method according to any of the preceding claim, wherein the weight of superparamagnetic or paramagnetic particle capable of binding the one or more analyte(s) present in the water source does not exceed 0.5 kg per 1.000 kg water (i.e. 0.5 wt %) independent of the size of the particle.

6. A method according to any of the preceding claim, wherein the weight of superparamagnetic or paramagnetic particle capable of binding the one or more analyte(s) present in the water source is at least 250 kg water/cm² particles.

7. A method according to any of the preceding claims, wherein the superparamagnetic or paramagnetic particle is capable of binding the one or more analyte(s) present in the water source by non-specific binding or by specific binding.

8. A method according to any of the preceding claims, wherein the superparamagnetic or paramagnetic particles are coated with an organic compound or an inorganic compound.

9. A method according to any of the preceding claims, wherein the superparamagnetic or paramagnetic particles are coated with a polymer, such as a polysaccharide, an alginate, a chitosan, a PEG, a dextran or a polyethyleneamine.

10. A method according to any of the preceding claims, wherein the superparamagnetic or paramagnetic particles are functionalized with a moiety capable of specifically binding the one or more analyte(s) present in the water source.

11. A method according to any of the preceding claims, wherein the water source is selected from seawater, produced water and water from an estuary, brackish water, and water having a salinity above 0.05%.

12. A method according to any of the preceding claims, wherein the water source is sea water.

13. A method according to anyone of the preceding claims, wherein the water source is in any form of untreated water souce or pre-treated water source, e.g. treated by reverse osmosis, nano-filtration, vapour distillation, or freezing desalination.

14. A method according to anyone of the preceding claims, wherein the water source has a salinity of less than 250.000 ppm.

15. A method according to anyone of preceding claims, wherein the water source in the capturing in step (ii) and/or the removing in step (iii) has a temperature in the range 4-60° C., preferably in the range of 4-40° C. and/or has a pressure in the range 1-200 atm.

16. A method according to claim 1, wherein steps (i), (ii) and (iii) are a continuous process of providing water depleted in the particular analyte(s).

17. A method according to any of the preceding claims, wherein the water has been depleted in at least one particular analyte(s), such as at least two particular analytes, e.g. at least three particular analytes, such as at least four particular analytes.

18. A method according to any of the preceding claims, wherein the water source and the superparamagnetic or paramagnetic particles are contacted in a first water tank.

19. A method according to claim 18, wherein the first water tank is made of a non-magnetisable or non-magnetic material such as plastic.

20. A method according to anyone of the preceding claims, wherein the depleted water is stored in a second water tank.

21. A method according to claim 20, wherein the second water tank has a volume of at least 1 m³.

22. A system comprising an oil production plant connected to at least one production well and a water purification plant connected to at least one injection well, wherein the water purification plant comprises at least one inlet, at least one capturing site, at least one analyte removing site and at least one outlet, said at least one capturing site comprises superparamagnetic or paramagnetic particles capable of binding one or more analyte(s) present in the water source and wherein the at least one removing site comprise a non-magnetisable material and means for applying a magnetic field wherein the outlet from the water purification plant is connected to the at least one injection well.

23. A system according to claim 22, wherein the diameter of superparamagnetic or paramagnetic particles are between 1 nm-10 μm, preferably the superparamagnetic or paramagnetic particles are superparamagnetic nanoparticles of size in the range of 1-1000 nm.

24. A system according to claim 23, wherein the particle size of the nano particles is in the range of 1-600 nm, such as in the range of 3-500 nm, e.g. in the range of 5-300 nm, e.g. in the range of 7.5-200 nm, such as in the range of 10-100 nm, e.g. in the range of 15-50 nm.

25. A system according to any of claims 22-24, wherein the superparamagnetic or paramagnetic particles are coated with an organic compound or an inorganic compound.

26. A system according to any of claims 22-25, wherein the superparamagnetic or paramagnetic particles are coated with a polymer, such as a polysaccharide, an alginate, a chitosan, a PEG, a dextran or a polyethyleneamine.

27. A system according to any of claims 22-26, wherein the superparamagnetic or paramagnetic particles are functionalized with a moiety capable of specifically binding one or more analyte(s) present in the water source.

28. A system according to any of claims 22-27, wherein the water source and the superparamagnetic or paramagnetic particles are contacted in a first water tank.

29. A system according to claim 28, wherein the first water tank has a volume of at least 1 m³.

30. A system according to any of claims 22-29, wherein the depleted water is stored in a second water tank.

31. Use of water depleted in one or more analyte(s) for recovering oil by water flooding, wherein the depletion of one or more analyte(s) from water is performed by capturing the one or more analyte(s) from a water source by contacting the water source with superparamagnetic or paramagnetic particles capable of binding the one or more analyte(s) present in the water source providing a capturing mixture followed by removing the analyte(s) bound to the superparamagnetic or paramagnetic particles from the capturing mixture by applying a magnetic field providing a water reduced in one or more analyte(s).

32. Use according to claim 31, wherein the superparamagnetic or paramagnetic particles are functionalized with a moiety capable of specifically binding the analyte(s) present in the water source.

The invention claimed is:
1. A method for recovering crude oil or natural gas from the ground, the method comprises the steps of:
   (i) providing a water source;
   (ii) depleting one or more analyte(s) from the water source by contacting the water source with a superparamagnetic or paramagnetic particle capable of binding the one or more analyte(s) present in the water source thereby providing a capturing mixture;
   (iii) removing the analyte(s) bound to the superparamagnetic or paramagnetic particles from the capturing mixture by applying a magnetic field thereby providing a depleted water;
   (iv) pumping the depleted water into one or more connecting injection well(s) in an oil field thereby pushing the crude oil towards one or more production well(s); and
   (v) recovering the crude oil from the one or more production well(s), wherein the superparamagnetic or paramagnetic particles are functionalized with a moiety capable of specifically binding the one or more analyte(s) present in the water source, and
wherein the functionalization moiety is adapted to specifically binding the superparamagnetic or paramagnetic particles to the one or more analytes and is selected as a polymeric or co-polymeric compound.

2. The method according to claim 1, wherein the analyte is a compound, a mineral, one or more elements or ions, a bacteria, phosphate pollutants, nitrates, sulphate and/or pollutants derived from detergent, pesticides or fertilizers.

3. The method according to claim 1, wherein the diameter of superparamagnetic or paramagnetic particles are between 1 nm-10 µm.

4. The method according to claim 3, wherein the superparamagnetic or paramagnetic particle size is in the range of 1-600 nm.

5. The method according to claim 1, wherein the weight of superparamagnetic or paramagnetic particle capable of binding the one or more analyte(s) present in the water source does not exceed 0.5 kg per 1.000 kg water (i.e. 0.05 wt %) independent of the size of the particle.

6. The method according to claim 1, wherein the weight of superparamagnetic or paramagnetic particle capable of binding the one or more analyte(s) present in the water source is at least 250 kg water/$cm^2$ particles.

7. The method according to claim 1, wherein the superparamagnetic or paramagnetic particle is capable of binding one or more other analyte(s) present in the water source by non-specific binding.

8. The method according to claim 1, wherein the superparamagnetic or paramagnetic particles are coated with an organic compound or an inorganic compound.

9. The method according to claim 1, wherein the superparamagnetic or paramagnetic particles are coated with a polymer.

10. The method according to claim 1, wherein the water source is selected from seawater, water from an estuary, brackish water, or untreated water having a salinity above 0.05%.

11. The method according to claim 1, wherein the water source is sea water or brackish water having a salinity above 2% and below 5.

12. The method according to claim 1, wherein the water source has a salinity of less than 250,000 ppm.

13. The method according to claim 1, wherein the water source in the capturing in step (ii) and/or the removing in step (iii) has a temperature in the range 4-60° C., and/or has a pressure in the range 1-200 atm.

14. The method according to claim 1, wherein steps (i), (ii) and (iii) are a continuous process of providing water depleted in the said analyte(s).

15. The method according to claim 1, further comprising water flooding an injection well with the depleted water.

16. The method according to claim 1, wherein the superparamagnetic or paramagnetic particles are superparamagnetic nanoparticles of size in the range of 1-1000 nm.

17. The method according to claim 1, wherein the superparamagnetic or paramagnetic particle size of the particles is in the range of 3-500 nm.

18. The method according to claim 1, wherein the superparamagnetic or paramagnetic particle size of the particles is in the range of 5-300 nm.

19. The method according to claim 1, wherein the superparamagnetic or paramagnetic particle size of the particles is in the range of 7.5-200 nm.

20. The method according to claim 1, wherein the superparamagnetic or paramagnetic particle size of the particles is in the range 10-100 nm.

21. The method according to claim 1, wherein the superparamagnetic or paramagnetic particle size of the particles is in the range of 15-50 nm.

22. The method according to claim 1, wherein the superparamagnetic or paramagnetic particles are coated with a polysaccharide, an alginate, a chitosan, a PEG, a dextran or a polyethyleneamine.

23. The method according to claim 1, wherein the water source is sea water or brackish water having a salinity around 3.5%.

24. The method according to claim 1, wherein the water source in the depletion in step (ii) and/or the removing in step (iii) has a temperature in the range 4-40° C., and/or has a pressure in the range 1-200 atm.

25. The method according to claim 1, wherein the water has been depleted in at least two particular analytes or at least three particular analytes or at least four particular analytes.

26. The method according to claim 1, further comprising fracturing a formation with hydraulic fluid that comprises the depleted water.

27. A system for recovering of crude oil comprising:
a water treatment plant;
one or more injection well(s); and
one or more oil production well(s), wherein:
the water treatment plant comprises a reaction region where superparamagnetic or paramagnetic particles will bind to analyte(s) and a holding region holding ready-to-bind superparamagnetic or paramagnetic particles, wherein the superparamagnetic or paramagnetic particles are functionalized with a moiety capable of specifically binding the one or more analytes present in the water source, and wherein the functionalization moiety is adapted to specifically binding the superparamagnetic or paramagnetic particles to the one or more analytes and is selected as a polymeric or co-polymeric compound,
the reaction region is connected to the holding region allowing addition of superparamagnetic or paramagnetic particles to the reaction region, the reaction region further has an inlet for untreated water, an outlet for treated water and is provided with means for mixing and means for applying a magnetic field, and
the reaction tank outlet for treated water is connected with the one or more injection well(s) which injection wells are further connected to the one or more oil production well(s).

28. The system according to claim 27, wherein the reaction region is provided with rigid walls of non-metallic material.

29. The system according to claim 27, wherein the water treatment plant comprises a third region in form of one or more storage compartments where the reaction tank outlet for treated water is connected to one or more storage compartments which storing compartments are then connected with the injection well(s).

30. The system according to claim 29, wherein the one or more storage compartments of the third region are dimensioned to hold at least an amount of treated water necessary for insertion in the injection well(s) during a residence time of the reaction region.

31. The system according to claim 27, wherein the water treatment plant further comprises a separation region where superparamagnetic or paramagnetic particles are regenerated from the mixture of superparamagnetic or paramagnetic particles bonded to analytes.

32. The system according to claim 27, wherein the water treatment plant is placed onshore whereas the oil production well and injection wells are placed offshore.

33. The system according to claim 27, wherein the reaction region is provided with rigid walls of plastic.

* * * * *